Figure 3:
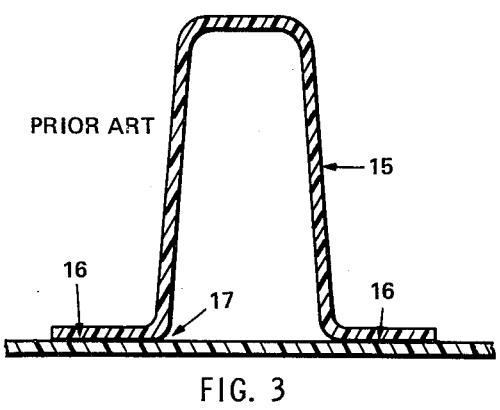

United States Patent [19]

Cogburn et al.

[11] 3,995,080

[45] Nov. 30, 1976

[54] FILAMENT REINFORCED STRUCTURAL SHAPES

[75] Inventors: Jimmie W. Cogburn; Billie E. Chitwood; Marvin S. Howeth, all of Fort Worth, Tex.

[73] Assignee: General Dynamics Corporation, Fort Worth, Tex.

[22] Filed: Oct. 7, 1974

[21] Appl. No.: 512,593

[52] U.S. Cl. ............................. 428/35; 52/731; 52/630; 428/119; 428/121; 428/130; 428/188; 428/902; 244/123; 244/124; 244/126

[51] Int. Cl.² ............................................ B32B 3/20

[58] Field of Search ............... 244/123, 124, 126; 161/57, 59, 60, 69, 130, 131, 134, 135, 137, 139, 152, 156, 166; 52/630, 731; 428/35, 36, 105, 107, 113, 114, 119, 121, 130, 183, 184, 294, 297, 902, 188

[56] References Cited
UNITED STATES PATENTS

| | | |
|---|---|---|
| 2,456,005 | 12/1948 | MacKinnon .................. 161/60 |
| 2,593,714 | 4/1952 | Robinson ..................... 161/139 |
| 2,833,682 | 5/1958 | de Laszlo ..................... 161/130 |
| 3,449,482 | 6/1969 | Mitchell et al. ................ 161/59 |
| 3,490,983 | 1/1970 | Lee ............................... 161/156 |
| 3,669,158 | 6/1972 | Phillips ......................... 161/93 |
| 3,768,760 | 10/1973 | Jensen ........................... 244/123 |

*Primary Examiner*—George F. Lesmes
*Assistant Examiner*—William R. Dixon, Jr.
*Attorney, Agent, or Firm*—Charles E. Schurman

[57] ABSTRACT

Strong, lightweight structural shapes or structures adapted for anistropic load bearing useful as structural beams or stiffeners for other structures, e.g., aircraft and which prevent or have improved resistance to forces tending to peel apart the structures, i.e., incipient peel. The shapes are fabricated from plicated laminates of strips or sheets of resinous, filament reinforced, composite materials having high strength and low weight. Fabrication of the shapes is carried out in such manner that upon curing of the resin the resultant stiffener shapes are capable of distributing loading forces so as to reduce localization of stresses.

14 Claims, 24 Drawing Figures

U.S. Patent Nov. 30, 1976 Sheet 3 of 3 3,995,080
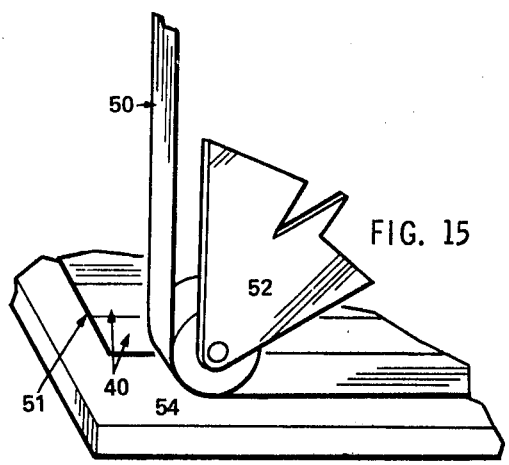
FIG. 15
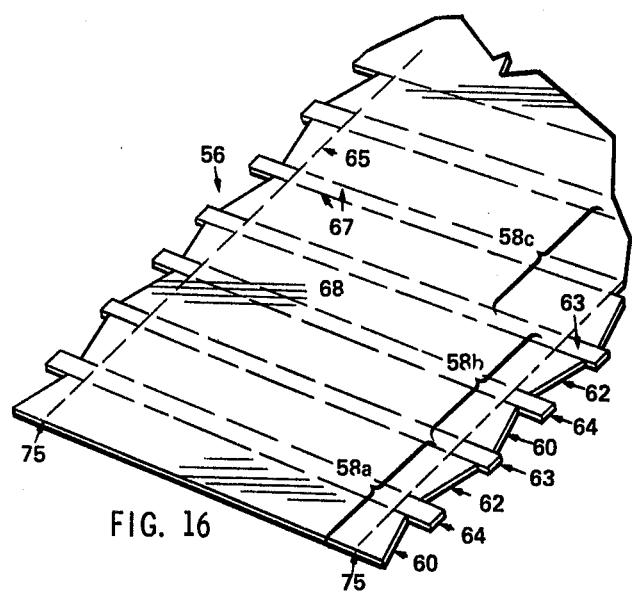
FIG. 16
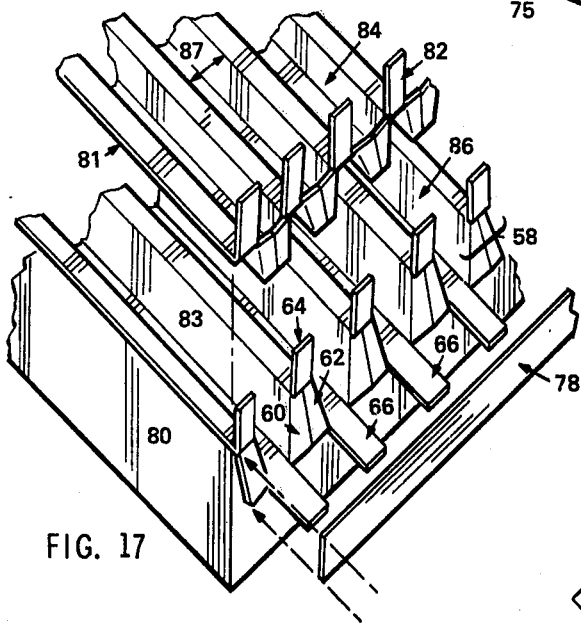
FIG. 17
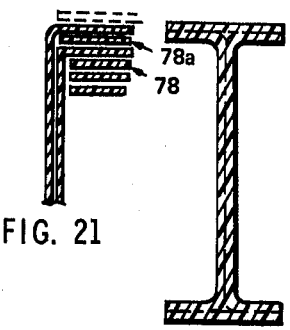
FIG. 21
FIG. 20
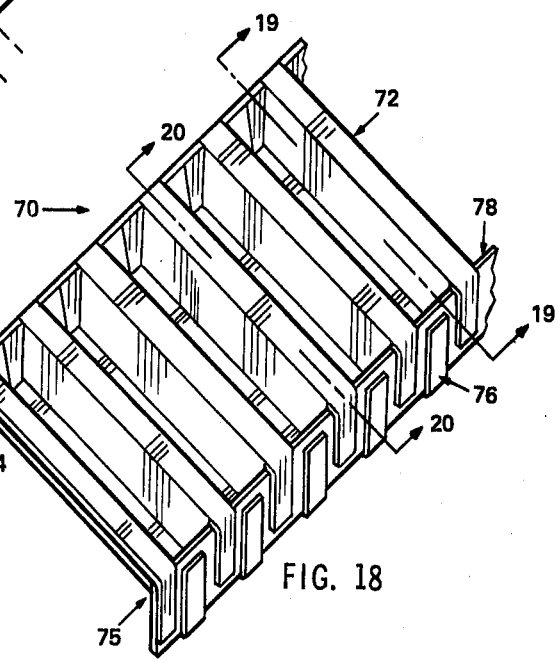
FIG. 18
FIG. 19
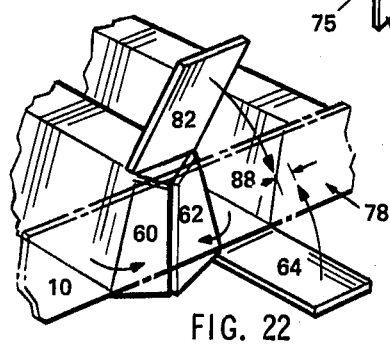
FIG. 22

FILAMENT REINFORCED STRUCTURAL SHAPES

BACKGROUND OF THE INVENTION

Standardized, integrally stiffened, structural shapes, fabricated by the extrusion of ductile metal have long been known in the structural art. However, such structures or shapes, fabricated by the lamination and resin polymerization or curing of resinous, filament reinforced, composite materials have only recently evolved. A drawback to their use however has been the problem of incipient peel or the tendency for stress forces to cause one part of the structure to be peeled away from an adjacent portion of structure. Therefore, it has been found desirable by the invention herein to provide lightweight, high strength, integrally stiffened, structural shapes which are peel proof or peel inhibited, to thus be particularly useful in the construction of integrally stiffened components for aircraft, missiles and space vehicles.

SUMMARY OF THE INVENTION

Structures of the present invention are advantageous in both structure and process of making them in that they utilize high strength, low weight, filament reinforced, composite material in which high tensile strength filaments are used as the load bearing material with the reinforcements embedded in a polymeric, organic resinous matrix or matrices. As used herein, high strength is defined as including tension compression and shear strength but can usually be regarded as the tensile strength. The peel resistant characteristics of structures of the invention provide for a high degree of structural integrity in the shape in its role as an integral stabilizing stiffener for skin, shell, web and plate structures, such as doublers, beads and hat sections for the shell or skins of an airframe or fuselage, webs for load carrying spar beams and bulkheads and for outer skin lift surfaces of aircraft wings or for other use.

The present invention then relates generally to integrally embodied or attachable structural shapes of laminated, filament reinforced, composite, resinous materials and a method for making same. In particular embodiments the invention is directed to integrally embodied stiffener shapes which contemplates the use of directionally arranged high tensile strength tectonic or load bearing filaments as reinforcements to a resinous matrix of lower strength characteristics so that weight savings are effected by orienting the reinforcements as necessary to accommodate designed-to loadings. Generally then, the structures of the invention have anistropic or non-uniformly the same load resisting characteristics, unlike metal structures.

Composites useful in the present invention have been found particularly advantageous when the organic resinous materials posses cured shear strength of at least about 5000 p.s.i. together with stability and good strength retention at elevated temperatures. Good strength retention resins are temperature resistant resins retaining at least about 50% of their room temperature ($70°\text{F} \pm 5°$) strength when subjected to up to $250°$ F. These include the polyimides, the epoxies, polyesters, phenolics and other filament-like or fiber structures having the requisite long length, and high strength needed to bear loads and impart stiffeners to the structures.

Examplary filament materials in the ranges of filaments found highly advantageous are listed in the table below which sets forth useful values of physical properties for designing to specific load requirements.

| Filament Material | Density lbs/in$^3$ | Modulus** $1 \times 10^6$ | Tensile K.s.i. | Specific Strength K.S.i./lbs/in$^3$ |
|---|---|---|---|---|
| Kevlar* (aromatic polyamide Fiber) | .052 | 19.0 | 525 | 10,000 |
| Graphite | .064 | 50.0 | 420 | 8,880 |
| Boron | .090 | 60.0 | 550 | 5,320 |
| Carbon | .045 | 22.0 | 130 | 228 |
| E-glass | .092 | 10.5 | 500 | 2,930 |
| Be | .066 | 35.0 | 185 | 697 |

*T.M. DuPont Co.
**Modulus of Elasticity or Young's Modulus in p.s.i.

**Modulus of Elasticity or Young's Modulus in p.s.i.

Examples of such resinous polymers found to give good results are listed in the table below showing ranges of useful values for strength characteristics important physical properties:

| Resinous Polymers | Specific Gravity | Specific Strength K.S.I. lbs.in$^3$ | Tensile Specific Modulus $(10)^6$ in. |
|---|---|---|---|
| Epoxy Novolacs | 1.24 min | 178–268 | 8.9–11.2 |
| Phenolics | 1.24–1.32 | 120–229 | 9.6–17.8 |
| Polyesters | 1.12–1.46 | 76–247 | 2.8–16.1 |
| Polymides | 1.43–1.47 | 94–145 | 10.2–14.5 |

The structural or reinforcing filaments and fibers found to be beneficially useful are those possessing combinations of mechanical properties of at least about the following: density in lbs./in.$^3$ of at least about 0.040; Young's modulus-of-elasticity of at least about 10 million pounds per square inch; and tensile strength in k.s.i. (thousand p.s.i.) of at least about 100, for the organic, resinous binders or matrix materials referred to above.

Accordingly, it is a primary object of the present invention to provide integrally formed filament reinforced, resinous, laminated composite material structural shapes and methods for manufacturing same whereby incipient peel at bond lines between laminae and all other potential load bearing incipient peel points or areas are either substantially reduced or altogether eliminated, and to reduce internal crack propagation in the structures.

Another object of the invention is to provide an integral stiffener of the above composite structure which is formed of plicated laminations of resinous, filament reinforced strips or sheets so arranged and disposed in such manner that peel separation between laminae along bond lines is notably inhibited or altogether prevented.

Figure 1:
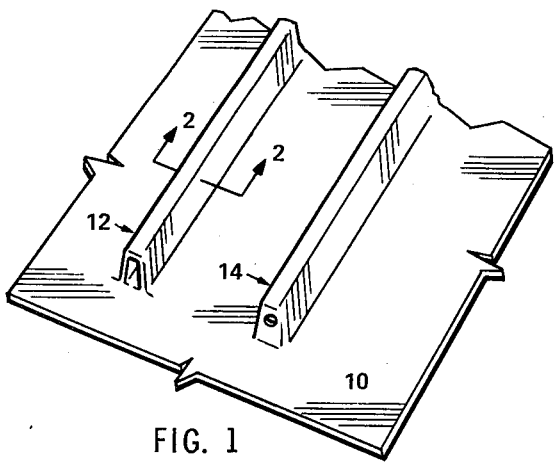

A further object is to provide integral shear webs in a composite beam structure which is formed from a series of corrugations or hat sections having tab members Referring now to FIG. 1 of the drawings, there are shown typical open-end and closed-end structural shapes or beams 12 and 14 respectively as would be employed for integral stiffeners or structural beams in stabilizing an aircraft fuselage skin component 10 or other object requiring structural bracing or reinforcement, in accordance with the present invention. Tectonic or structural load bearing or resisting materials of either a resin impregnated woven fiber or other directionally oriented tectonic filaments embodied in a tough, resinous, usually thermosetting, matrix material are selectively employed for its construction in accordance to the structure designer's load calculations or related design requirements.

This laminated shape is formed and folded im such manner that, upon being permanently set and integrally structured by co-curing or polymerization of its impregnated resinous matrix, under pressure, the resultant hat section's or other shaped beam's shear webs or stiffener walls both functionally and physically translate from a single, web defined, shear load path into a plurality of generally symmetrically divergent load paths for effecting generally oppositely directional distribution of resultant peel inducing tension stress into its basal beam cap or other load bearing structure to be stiffened, reinforced or stabilized.

In contrast, conventional structural shapes of the known art, such as shown in FIG. 3, are normally employed for similar purpose in present day operational aircraft and aerospace vehicles. These are usually fabricated by the adhesive bond line 16 assembly of detail elements or pieces 15, from one or more of various materials referred to herein as composites or composite materials or from isotropic materials such as metals, e.g., aluminum, steel, titanium and the like. The FIG. 3 structure is prone to peel failure at 17. Metals, it may be noted, are substantially isotropic in character insofar as their capability for carrying structural loads is concerned. However, aircraft and aerospace vehicles rarely impose purely isotropic stresses upon their load carrying components when functioning in their normal mode of operation, but rather impose stress loads that are generally anisotropic in character, usually being derived from aerodynamics and pressure forces that are substantially at least momentarily unidirectional. Anisotropic materials for purposes of this invention may also be so-called quasi-isotropic materials.

Figure 2:
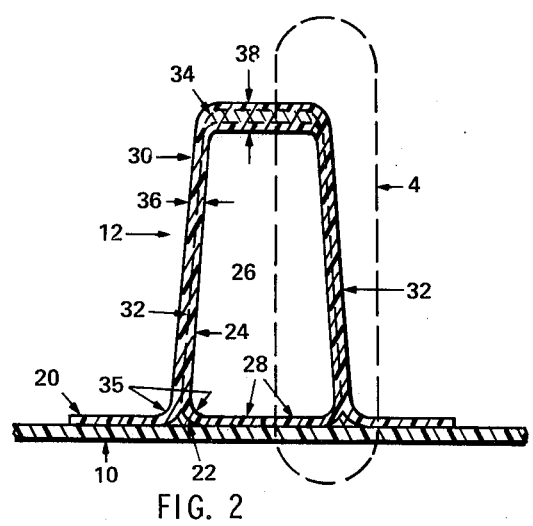

Such major structural components of aircraft, when constructed of directionally oriented, filament reinforced, tectonic strip laminae, realize weight reductions over conventional metal structure of from 0 to 35%. These weight reductions are the direct resultant of oriented tectonic filaments in directional consonance with the primary stress load; thus imparting an anisotropic and substantially unidirectional load bearing path into the object integument, e.g., aircraft skin forming a beam cap, or into primary structure. Such anisotropic composite structure provides significant advantage over metallic structural shapes of the conventional type in that the mass of tectonic, filament reinforced, composite structure is disposed in the aircraft skin component or primary component in such manner as to satisfactorily carry the primary stress loads without suffering the dead weight penalty imposed upon metal and other isotropic structures. The present load bearing structure is designed and made with oriented unidirectional, filament reinforced strips of tape to form like orientation in a given ply of a sheet to fulfill the criteria and pre-calculated load requirements for bearing the primary load condition; secondary loads being transferred by orienting a lesser number of the filament reinforced tapes in the directions of the flow paths of these secondary loads. Metal and other isotropic materials have the inherent capability for carrying primary loads in all directions but are, in actuality and of necessity, constituted and employed for bearing a primary load substantially in one general direction only; the substantially unstressed material merely constituting dead weight. Dead weight, which must be carried about by the object aircraft or other vehicle, is not only structurally useless but also imposes a severe useful-load penalty on any airborne or space vehicle and becomes a very deletereous factor when its overall effect on operational efficiency is taken into consideration. The embodiment 12 shown in FIG. 2 is a composite structural shape designed to serve as an integral stiffener or stabilizing element in an airframe or fuselage component and generally comprises an outer integument 10 such as an aircraft fuselage skin of tectonic, filament reinforced, composite material such as graphite or boron impregnated with a tough resinous polymer, usually thermosetting, such as with one of the epoxies or epoxy novolaces. An inner liner element 24 (see FIG. 2) whose cross-sectional configuration is defined by the profile of forming mandrel 26, is made from laminated tectonic composite material having one or more plies and one or more layers of reinforcing filaments and is formed by wrapping or folding the pliant composite material over and about the mandrel in such manner that its inwardly folded edges 28 abut in a conterminal manner underneath and adjacent to the lower face of the mandrel. Such counterminal or abutment line falls substantially upon and along the longitudinal axis of the mandrel's lower surface plane. However, the inner liner is, after curing, continuous around the mandrel. An outer over-lay or sheathing ply 30 of the composite laminated material is over-laid about mandrel 26 to constitute an over-ply in respect to the shear webs 32 and crown 34 portion of inner liner ply 24 but has outwardly extending edges from its lower portion which form flanges 20 and provide a directional divergence at the lower ends of the shear webs for dividing and distributing stress resultants which tend to separate and peel inner liner 24 and outer overlay 30 away from panel skin 10 at and along the peel plane tangent of radius 35.

Figure 4:
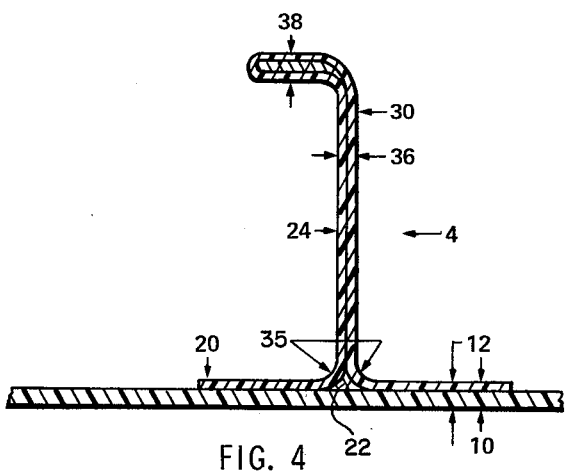
Figure 5:
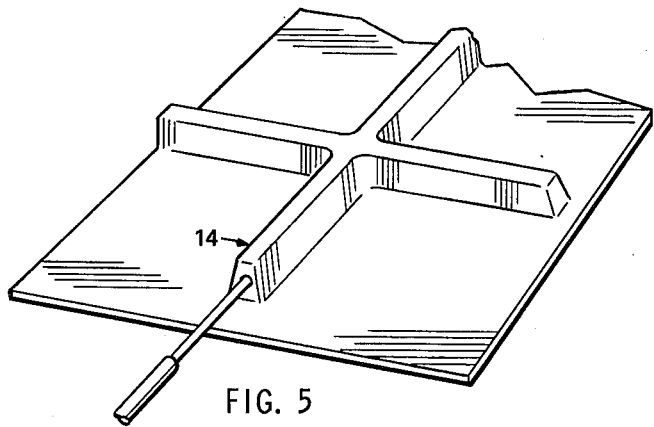

It is to be noted that each of the vertical legs 36, when taken together with those portions of the upper and lower end plates or caps with which they are integrally connected, functionally define classic individual I-Beams as exemplified in FIG. 4; the vertical composite legs 36 each defining a shear web and the horizontal composites 38 and 10 defining its first and second beam caps which are upper and lower respectively. Such classic I-Beam is also functionally delineated by the section shown in FIG. 20.

Figure 6:
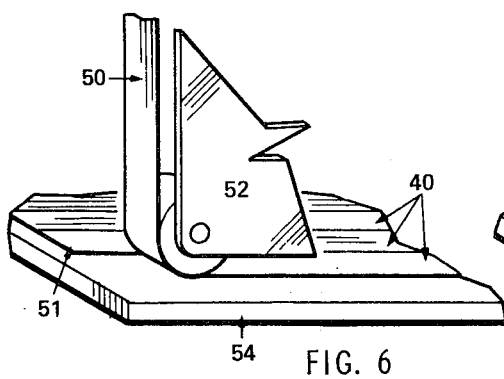
Figure 7:
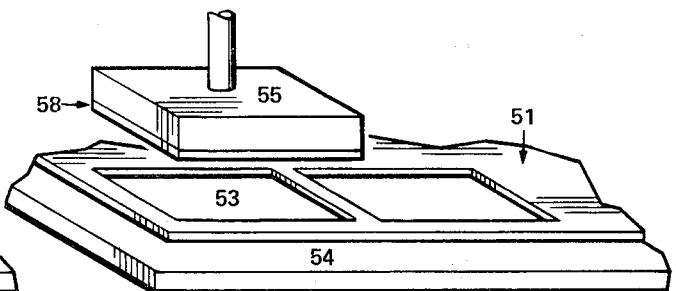
Figure 10A:
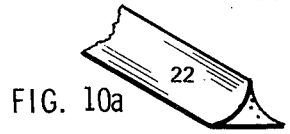
Figure 8:
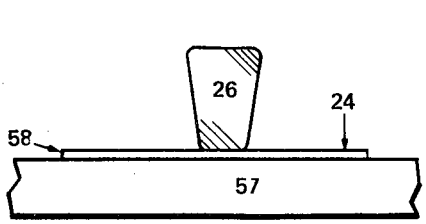
Figure 9:
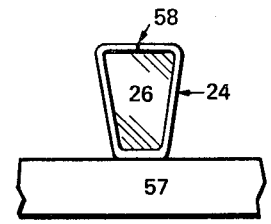
Figure 10:
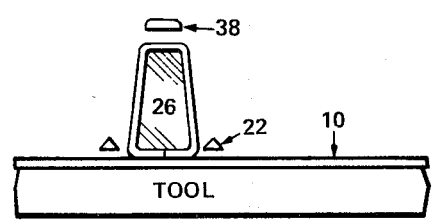
Figure 11:
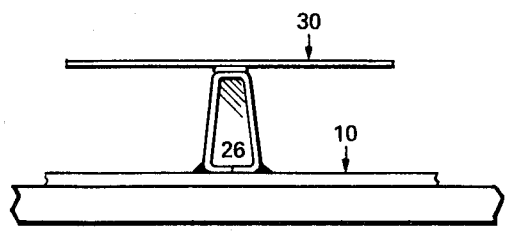
Figure 12:
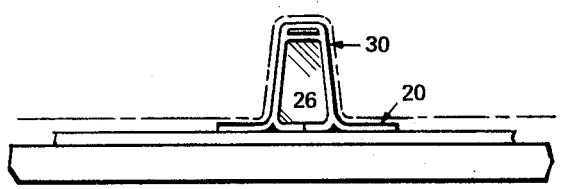
Figure 13:
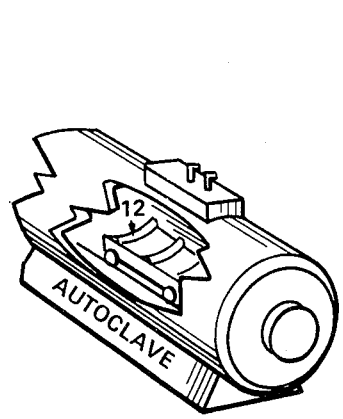
Figure 14:
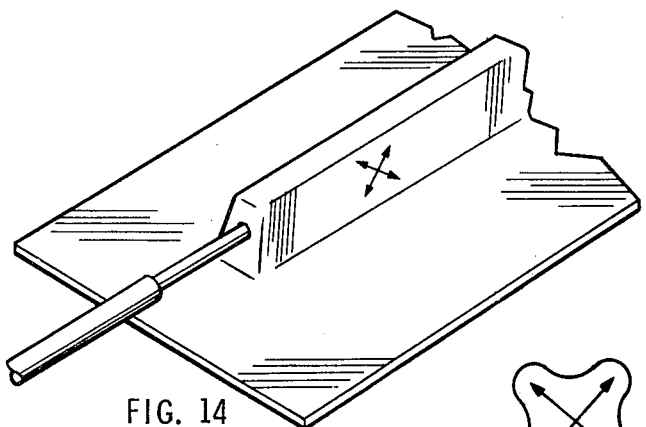
Figure 14A:
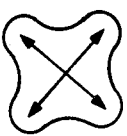

Initially the object panel, skin or other integumental components of aircraft or other structural surfaces to be integrally stiffened and stabilized is fabricated by contiguous lay-up and lamination of strips or sheets 40 of filament reinforced, resinous tapes, which are directionally oriented in each ply and a plurality of plies laminated in a predetermined relationship to effect the desired anisotropic composite component. This lay-up is made on a suitable planar receptacle or receiving surface as shown in FIG. 6. While still in its uncured pliable condition, this skin, shell or other integument 51 is cut to the desired profile 53, FIG. 7, by blanking die 55 to form the detail pieces (e.g., 24) and so arranged that it conforms to the shape and size desired and then positioned on the assembly tool surface or receptacle 57, FIG. 8, in readiness to receive wrapped mandrel 26, FIG. 9, and its uncured plies of blanked laminate 24. Such plies are also fabricated from tectonic, filament reinforced, resinous strips, tapes or sheets which are contiguously laid up on the surface of a receptacle tool 54 and laminated in a manner generally similar to that employed in fabricating the skin 10, FIG. 2, of the receiving panel component. Detail blanks of the required configuration or of flat profile are then stamped or otherwise cut from the lay-up sheet or ply 51 as shown in FIG. 7 by a blanking die 55 or other suitable cutting means. This blank 24, FIG. 8, is then folded over and about mandrel 26 in such manner as to completely wrap around the mandrel until the edges 58 are abutted in conterminal relationship. The laminated ply 24 wrapped about mandrel 26 becomes inner liner element 24, FIG. 2, forming the folded edges of inner flanges 28 and upon the over-lay of outer or sheathing ply 30, FIGS. 11 and 12, and the outward extension of such ply's lower portion forms outer flanges 20. This is effected by inverting the wrapped mandrel, FIG. 9, upon skin 10 and locating the crown stiffener 38 and radius stiffeners 22, FIG. 10. Over-lay blank 30 is placed in position over wrapped mandrel 26, as shown in FIG. 11, and such over-lay blank 30 is formed to the hat configuration shown in FIG. 12.

This entire assembly is then vacuum bagged and evacuated to effect an evenly distributed constrictive pressure upon all elements of the assembly prior to curing and then placed in a pressurizing autoclave, oven or other suitable curing medium for polymerization and thus co-curing the entire assembly with all component elements in place and thereby integrally unifying them into a single integrally stiffened eskin, panel or other object stabilized component. The mandrel is then removed. Where it is destructible sodium silicate as noted above the soluble matrices of the granules which constitute the compacted granular sodium silicate mandrel are thereafter dissolved and the granules washed out without damage to inner liner or other parts of the structure. From the foregoing it will be readily apparent that this manufacturing process combines the use of expendable, deformable (e.g., rubber type), destructible mandrels and the process for co-curing of all elements of an assembly of tectonic, filament reinforced, resinous materials to thereby integrally unify such elements into a single, stiffened and stabilized, structural panel or other similar integumental components.

It will be observed (see FIGS. 2 and 4) that the lower cap stiffener means has a prism-like configuration of generally triangular cross-section and disposed longitudinally of the beam between oppositely directed flange portions of the web means, with upper outer-directed surfaces of the prism-like configuration being formed to a radius-like concave curvature and bonded to inner directed surfaces of the web means flange portions along said concavely curved surfaces and the lower surface of the configuration being substantially flat and bonded to lower or basal portions of the lower cap member 10.

Another beam formed in accordance with the invention, as shown in FIG. 18, contemplates as an end product a structural shape or beam that is reinforced and stiffened by integrally combining a corrugated web structure with spar or beam caps, resultant in a unitary, capped shear beam structure wherein all incipient failure points under substantial tension-peel strain are eliminated and therefore failure of the beam in such peel tension stress mode does not occur. For example, FIG. 19 shows that the fold-over tabs arrangement in respect to the corrugated web defines a capped shear beam which cannot fail in the peel-tension stress mode.

FIG. 18 exemplifies such embodiment of the invented structural article and its method of manufacture, FIGS. 15 through 18. Filament reinforced tectonic tape 50, FIG. 15, of an organic resinous material is positioned by a tape lay-up machine 52 or other suitable means to form a sheet lay-up 51, upon a suitable die form face plate or other suitable receiving surface 54 and suitable blanks cut therefrom, such, for example, as shown by 53, FIG. 7, in a manner substantially identical to that shown in FIG. 7, where blanks being cut for employment in the fabrication of integral skin stabilizing stiffeners are shown, rather than tabbed blanks as shown in FIG. 16. Such tape lay-up includes lamination and directional orientation of filaments and tapes in a pre-calculated and pre-determined manner within the purview of the requirements for the resultant structural article. The blanked-out flat pattern illustrated in FIG. 16 exemplifies the edged or fringed flat pattern of fold-over tabs and intervenient slits for fabricating an integrally capped section of aircraft spar or beam 70, FIG. 18, having a corrugated web 72. This beam structure is designed to act as a capped shear beam and is normally loaded in a bending moment which imposes shear stresses upon the corrugated web and a transitional peel-tension resultant stress all along the line of intersection or bend line 75 between the corrugated shear web 72 edges and the spar's end caps 74 and 76. Therefore, no peel-tension failure occurs along this line nor is initiated at any point thereon. Failure then occurs by tearing or fracturing of the filament reinforcements of the laminated material itself and by peel separation at bond lines.

As may be seen from an examination of the flat pattern or blank in FIG. 16, a series of tab portions or extensions of differing configurations, 60 through 64, along with interspersed slits 65 are provided along both upper and lower longitudinal fringes or edge of the blank or flat pattern 56 forming the detail piece. These tab extensions are, for purposes of descriptive definition segregated into groups of three: 58a, b and c with single tabs 63 positioned interjacent these respective groups.

Each group comprises a tab 64, having a normal or squared outer edge and flanked on its adjacent lower side by a tab extension having an inwardly biased outer edge 60 and on its adjacent upper side by a tab extension having an outwardly biased outer edge 62. Corrugations are formed laterally by positioning blank 56 over the corrugated lower die element of a corrugating tool 80 in such manner that alternate apex bend lines coincide with the bend lines of the lower die element corrugations. The teeth of the splined element of the upper die (not shown) are thereupon depressed into the lower element's die cavities to form corrugations fold lines 67 in web 72. With the lower die element still in place biased tabs 60 and 62 in each group 58a, b, c, etc., are diagonally folded by respectively folding each about the respective vertical end faces of the die elements.

The spar cap is reinforced to the degree desired by inserting a strip or plate 78 and folding tabs 64 and 66 upwardly and downwardly, respectively, in such manner that the strip insert 78 is wrapped and enfolded thereby. Thus when co-cured with the remainder of the assembly it becomes blended-in and integral with corrugated web 72 as a reinforcing end plate which reinforces and structurally stabilizes the corrugated shear web.

Tabs 82 and corrugations 84 of the upper ply 81 in FIG. 17 are so positioned in respect to tabs 64 and corrugations 86 of lower ply 83 that they define an exact mirror image of the lower tabs and corrugations. However, prior to being nested into and mated with the lower ply, the upper ply is displaced the distance of the width on one corrugation ridge 87 and then nested into the trough and over the ridge of that adjacent corrugation. Tabs 60 and 62, FIG. 22, are then folded over and against the end face of the corrugating die's lower member 80, FIG. 17, and tab 82 is folded and overlapped in a plane normal to its fold line in such manner that these overlapping folded tabs, when co-cured and integrated with the remainder of this capped shear beam's structure, define integral flanges which extend in planes substantially normal to the portion of the web members to which they integrally attach. Reinforcing end plates 78 may be added and inserted. This is effected by employing any number of tabs which are added by adding plies and folded over together or sequentially in such manner that end plates 78 and 78a are completely shrouded and constricted as illustrated by 78 in FIG. 18 and by the cross-section illustration of FIG. 21. When co-cured these folded tabs and reinforcing end plates are transformed into an integral shear capped and corrugated web beam having the advantages stated above.

It will be appreciated that the radius stiffeners 22, particularly when containing the high modulus tectonic filaments such as those of boron or graphite, provide considerable stiffening of the lower cap member. Of course, the stiffeners together with still lower or other more basal portions of the structure, e.g., the panel skin 10, together form a lower cap member or beam flange for the beam structure.

It will be appreciated that various modifications will occur to those skilled in the art.

What is claimed is:

1. A structural beam formed from a plurality of plies of composite material each containing high tensile strength filaments in a resin matrix laid up together and cocured around a plurality of reinforcing strips of unidirectionally arranged high modulus filaments to form a unitary beam structure combining high strength and low weight with resistance to internal peel forces and crack propagation comprising:
    a. an upper member extending in the longitudinal direction of the beam;
    b. a lower cap member extending in the longitudinal direction of the beam and spaced from said upper cap member;
    c. said upper and lower cap members each having at least one strip-like stiffener means therein containing a plurality of high modulus of elasticity stiffening filaments generally unidirectionally arranged generally parallel to the length of the beam for providing resistance to bending and compression forces at upper and lower or basal portions of said structure;
    d. substantially planar shear web means containing a plurality of layer of high tensile strength filaments integrally connecting said upper and lower cap members for transmitting loading forces therebetween, the filaments of each of said layers being generally transverse with respect to the filaments of said stiffener means;
    e. said filaments held in a resin matrix material for bonding the filaments in the desired configuration and transmitting of loading forces between filaments;
    f. said web means at least at said lower cap member having generally oppositely directed flange portions extending generally transverse to said web means and integrally connected therewith for distributing the loading forces in said shear web means to the lower cap member along oppositely directed paths and to opposite sides of said web means;
    g. said upper cap member stiffener means extending to substantially the full width of the upper cap member; and
    h. said lower cap member stiffener means having a prism-like configuration of generally triangular cross-section and disposed longitudinally of the beam between said oppositely directed flange portions of the web means, upper outer-directed surfaces of said lower cap member stiffener means prism-like configuration being formed to a radius-like concave curvature and bonded to inner-directed surfaces of said web means flange portions along said concavely curved surfaces and the lower surface of said configuration being substantially flat and bonded to lower or basal portions of said lower cap member; and
    i. the filaments of said stiffener means having a higher modulus of elasticity (Young's modulus) than the filaments of said web member to provide resistance to bending and compression forces;
    whereby a strong, lightweight beam structure is produced in which shear forces tending to separate said flanges from basal portions of the beam act simultaneously in opposite directions distributed over the full upper-directed area of said concavely curved surfaces, thereby decreasing the tendency for peeling forces to separate said web from said lower cap member when loading forces are acting on said beam.

2. The structural beam of claim 1 in which said lower cap member stiffener means fills the entire space between said oppositely directed flanges of the web means.

3. The structural beam of claim 1 in which said lower cap member stiffener means is narrower in width than the width of said upper cap member stiffener means.

4. The composite structural beam of claim 1 in which the filaments of the web member are at an angle of from about 30° to about 60° with respect to the filaments in at least one of said cap members.

5. The composite structural beam of claim 1 in which the portion of said web member spacing apart said cap members lies essentially in a single plane.

6. The composite structural beam of claim 1 in which said resin matrix has a temperature resistance of at least about 250° F and a cured shear strength of about 5,000 p.s.i.

7. The composite structural beam of claim 1 in which said stiffener means filaments have a tensile strength of at least about 130,000 p.s.i.

8. The composite structural beam of claim 1 in which said stiffening filaments of said stiffener means are selected from the group consisting of boron and graphite load-bearing type filaments and said web member filaments are selected from the group consisting of aromatic polyamide filaments and fiberglass filaments.

9. The structural beam of claim 1 in which the filament of said upper and lower cap member stiffener means have a modulus of elasticity of about 50 million p.s.i. or above.

10. The structural beam of claim 1 in which said filaments of said web means have a modulus of elasticity of about 10 million p.s.i. or above.

11. The structural beam of claim 1 in which said one of said caps is a portion of the exterior skin of an aircraft.

12. The structural beam of claim 1 in which said web means is a plurality of generally flat web members each lying substantially entirely in a single plane.

13. The structural beam of claim 12 in which said strip-like upper cap member stiffener means is a single strip and said strip-like lower cap member stiffener means comprises a pair of stiffener strips each having a generally triangular cross-section.

14. The structural beam of claim 12 in which said lower cap member is a portion of the skin of an aircraft.

* * * * *